3,149,985
PREPARATION OF SILICA GELS FROM ALKALINE SILICATES AND POLYALCOHOL ESTERS
Louis Gandon, Petit-Quevilly, France, assignor to Nobel-Bozel, Paris, France, a joint-stock company of France
No Drawing. Filed May 8, 1962, Ser. No. 193,322
Claims priority, application France May 12, 1961
7 Claims. (Cl. 106—74)

It is known that it is possible to produce from an aqueous solution of alkaline silicate, by the action of glyoxal, a gel which converts to a very hard mass, insoluble in water and having a high mechanical strength. However, such methods are very expensive, by reason of the relatively large proportions of glyoxal which they necessitate.

It has also been proposed to utilize as hardening agents, in the preparation of hard silica gels, organic liquids such as the fatty acids or ethyl acetate. These reagents are, however, insoluble in the aqueous solutions of alkaline silicates: they must be put into emulsion with the silicate solution; the emulsions obtained are not stable, which renders their practical utilization extremely difficult.

Other solutions have been recommended, for example the use of formamide. But this substance is too violent as a hardening agent if it is employed in the pure state or in a concentrated aqueous solution, while it is too slow if it is used in a more dilute solution.

In fact, none of the solutions recommended up to the present time has made it possible to resolve the problem in a manner which is satisfactory in practice.

The present invention enables all of the above-mentioned drawbacks to be overcome.

The essential object of the invention is the preparation of a silica gel which converts to a very hard mass having the properties of a mortar, from an aqueous solution of alkaline silicate, which comprises in solution a hardening agent constituted by a polyalcohol ester having a relatively low hydrolysis constant, the solution of the said polyalcohol ester in the said aqueous solution of silicate being effected by virtue of the presence of a compound playing the part of an additional solvent, the alkaline silicate to be utilized being preferably a silicate having a molecular ratio $SiO_2:Me_2O$ greater than or equal to 4, Me representing an alkali metal, for example sodium or potassium.

For carrying out the method forming the object of the invention, the polyalcohol ester as defined above may be dissolved in the said additional solvent and then, after dilution with water, the stable solution obtained is added to the aqueous solution of alkaline silicate, so as to obtain a homogeneous solution which, at the end of a certain time, forms a gel which becomes increasingly hard and is finally transformed to a mortar which is practically insoluble in water.

Without departing from the scope of the invention, it is possible to employ any other method of mixing.

The polyalcohol esters with relatively low hydrolysis constants which are suitable for carrying the invention into effect are, for example: glycerol triacetate (triacetine), glyoxal tetra-acetate, pentaerythritol tetra-acetate, diacetate of ethylene glycol, triacetate of trimethylol-propane, etc. It should be noted that each of these esters contain no free OH groups.

As the additional solvent, there can be utilized formamide, dimethyl-formamide, urea, etc. In practice, additional solvents such as formamide will be utilized for preference, which already possess inherently a certain hardening power.

As the aqueous solution of alkaline silicate, there will be employed, for example, a solution of sodium silicate having a molecular ratio $SiO_2:Na_2O$ greater than or equal to 4.

In the case of the use of formamide as the additional solvent, the concentration of the formamide in the aqueous solution of hardening agent should not exceed about 45 to 50% by weight.

The concentration in hardening agent, that is to say in polyalcohol ester, in the said solution, is only limited by the solubility of the ester. If there is considered, for example, the limiting case of an aqueous solution of hardening agent with 45-50% by weight of formamide, the limit concentrations of hardening agent are 140 grams per litre of triacetine, 110 grams per litre of triacetate of trimethylol-propane, 65 grams per litre in the case of tetra-acetate of penta-erythritol, etc. The maximum possible concentrations of hardening agent are higher when the concentration of formamide is lower.

For the preparation of stable solutions of alkaline silicate having a molecular ratio higher than or equal to 4, there can for example be added slowly, while stirring in the hot state, an aquasol of silica, free from electrolyte and freshly prepared, containing 8 to 10% of $SiO_2$ by weight, to a concentrated commercial solution of sodium silicate having a molecular ratio $SiO_2:Na_2O$ equal to 3.5 to 3.7.

The described formation of mortar insoluble in water takes place with the same readiness when there are added to the reaction medium certain additive products: sand, chalk, kaolin, starches, etc. The method is especially advantageous, in particular for the consolidation or waterproofing of sandy or porous soils, for the preparation of foundry cores, etc.

Thus, for example, if there is introduced in a uniform manner into a sandy soil a preparation of alkaline silicate incorporating the hardening agent in accordance with the invention, the gel forms within the mass and there is obtained a very hard consolidated ground on which structures can be built. In the same way, it is possible to alter the permeability of ground on which it is intended to construct dams, water reservoirs, etc.

Similarly, for the purpose of foundry cores, the gel is formed within the mass of sand by mixing the foundry sand with a silicate preparation according to the invention. This gel hardens and gives hard cores having excellent mechanical properties.

The technical progress achieved by the present invention is very great. The invention reveals that the polyalcohol esters are remarkable reagents for the preparation from alkaline silicates of very coherent and very hard masses; it also shows the conditions necessary to obtain this result; utilization of polyalcohol esters having relatively low hydrolysis constants; use of an additional solvent. The invention finally reveals that it is advantageous to utilize solutions of alkaline silicate having a molecular ratio $SiO_2:Me_2O$ greater than or equal to 4.

From the economic standpoint, the choice of such solutions already represents a considerable economy in neutralizing agent, that is to say of hardening agent. To this it should be added that, for the same weight with respect to conventional neutralizing agents, the polyalcohol esters, by reason of their poly-functional properties, have a considerably higher neutralizing power.

There are given below by way of indication but without any limitation, some examples of execution of the method forming the object of the invention.

Example 1

A solution of hardening agent is prepared by introducing 62 grams of glyoxal tetra-acetate in powder form into 300 grams of technical formamide (at 98%); after complete solution, the volume is brought up to 1,000 cc. by the addition of water. The solution obtained is perfectly stable.

10 parts by volume of this solution are added while stirring to 100 parts by volume of an aqueous solution of sodium silicate having a density of 1.21 and a molecular ratio $SiO_2:Na_2O=5$, incorporating 250 grams of $SiO_2$ per litre. There is obtained a homogeneous solution which, after standing for one hour at ambient temperature (20° C.), leaves a gel; the latter becomes increasingly hard and acquires the properties of a mortar.

At the end of 24 hours, this mortar, which has become very hard, is subjected to the action of running water in order to determine its loss of weight at the end of 1 hour, 3 hours, 24 hours. This loss of weight is expressed in loss per hour as a percentage of the initial weight of the mortar. The following figures are thus obtained:

After 1 hour _____ Nil.
The 2 hours following _____ 1.25% per hour.
The 21 hours following _____ 0.17% per hour.

These very low losses of weight, which correspond to the elimination of impurities soluble in water, and which tend towards zero, are considered by those skilled in the art as an index of high quality for the material.

If there were used in this example an aqueous solution of sodium silicate having the same concentration in $SiO_2$ (250 grams per litre), but having a molecular ratio $SiO_2:Na_2O=3.5$, there would be required 30 parts by volume of the same hardener solution to obtain a gel having the same performance with respect to water.

Example 2

There is prepared a solution of hardening agent by dissolving 90 grams of pure glycerol triacetate in 300 grams of technical formamide. The volume is then brought up to 1,000 cc. by the addition of water. The solution obtained is perfectly stable.

15 parts by volume of this solution are added while stirring to 100 parts by volume of an aqueous solution of sodium silicate having a density of 1.23 and a molecular ratio $SiO_2:Na_2O=4$, incorporating 250 grams of $SiO_2$ per litre. There is obtained a homogeneous solution which, after standing for two hours, leaves a gel. This gel becomes increasingly hard and acquires the properties of a mortar.

At the end of 24 hours, this mortar, which has become very hard, is subjected to the action of running water in order to determine its loss of weight at the end of 1 hour, 3 hours, 24 hours. This loss of weight is expressed in loss per hour as a percentage of the initial weight of the mortar. There are thus obtained the following figures:

After 1 hour _____ 3.2%.
The 2 hours following _____ 0.9% per hour.
The 21 hours following _____ 0.17% per hour.

If in this example the 15 parts by volume of hardening solution were replaced by 15 parts by volume of an aqueous solution of 300 grams per litre of formamide alone, without glycerol triacetate, there would be observed a separation of gel at the end of 24 hours; but the gel formed would not have the required properties. It does not become transformed to a mortar; when placed in running water, it disaggregates completely at the end of 24 hours.

Example 3

A solution of hardening agent is prepared by dissolving 72 grams of pure trimethylol-propane tri-acetate in 450 grams of technical formamide. The volume is then brought up to 1,000 cc. by the addition of water. The solution obtained is perfectly stable.

10 parts by volume of this solution are added while stirring to 100 parts by volume of an aqueous solution of sodium silicate having a density of 1.16, a molecular ratio $SiO_2:Na_2O=5$, containing 200 grams of $SiO_2$ per litre. There is obtained a homogeneous solution which, after standing for two hours, leaves a gel. This gel becomes increasingly hard and acquires the properties of a mortar.

At the end of 24 hours, this mortar, which has become very hard, is subjected to the action of running water in order to determine its loss of weight at the end of 1 hour, 3 hours, 24 hours. This loss of weight is expressed in loss per hour as a percentage of the initial weight of the mortar. There are thus obtained the following figures:

After 1 hour _____ 3%.
The 2 hours following _____ 1.2% per hour.
The 21 hours following _____ 0.15% per hour.

I claim:

1. A method of preparation of a silica gel in the form of a very hard mass substantially insoluble in water comprising adding 10–15 parts by volume of a solution of a hardening agent to 100 parts by volume of an aqueous solution of an alkaline silicate, said solution of hardening agent comprising an aqueous solution of a polyalcohol ester selected from the group consisting of glycerol triacetate, glyoxal tetra-acetate, pentaerythritol tetra-acetate, diacetate of ethylene-glycol and triacetate of trimethylol-propane, dissolved in an additional solvent selected from the group consisting of formamide, dimethyl-formamide and urea, said additional solvent not exceeding 50% by weight of said hardening agent solution, the alkaline silicate utilized having a molecular ratio $SiO_2:Me_2O$ at least equal to 4, Me being selected from the group consisting of sodium and potassium; stirring to obtain a homogenous solution; and permitting the solution to stand until a gel forms.

2. A method in accordance with claim 1, in which the operations are carried out in the presence of substances selected from the group consisting of sand, chalk, kaolin and starch.

3. A method in accordance with claim 1 in which the solution of hardening agent is an aqueous solution of not to execed 140 gms. of said polyalcohol ester per liter of solution.

4. A method in accordance with claim 3 in which the operations are carried out in the presence of substances selected from the group consisting of sand, chalk, kaolin and starch.

5. A method in accordance with claim 1, in which said aqueous solution of alkaline silicate is an aqueous solution of sodium silicate.

6. A method in accordance with claim 5, in which the operations are carried out in the presence of substances selected from the group consisting of sand, chalk, kaolin and starch.

7. A method of altering the permeability of soil which comprises introducing into the soil an aqueous solution of an alkaline silicate to which has been added 10–15 parts by volume of an aqueous solution of a hardening agent for each 100 parts by volume of silicate solution, said alkaline silicate having a molecular ratio $SiO_2:Me_2O$ at least equal to 4, Me being selected from the group consisting of sodium and potassium, said hardening agent being a polyalcohol ester selected from the group consisting of glycerol triacetate, glyoxal tetra-acetate, pentaerythritol tetra-acetate, diacetate of ethylene-glycol and triacetate of trimethylol-propane, dissolved in an additional solvent selected from the group consisting of formamide, dimethyl-formamide and urea, said additional solvent not exceeding 50% by weight of said hardening agent solution, whereby a very hard gel substantially insoluble in water forms within the soil to yield a very hard consolidated mass.

References Cited in the file of this patent

UNITED STATES PATENTS

| | | |
|---|---|---|
| 2,492,790 | Farkas et al. | Dec. 27, 1949 |
| 2,766,130 | Dietz | Oct. 9, 1956 |
| 2,829,060 | Garton et al. | Apr. 1, 1958 |
| 3,004,921 | Stossel | Oct. 17, 1961 |
| 3,028,340 | Gandon et al. | Apr. 3, 1962 |